United States Patent [19]

Brown

[11] Patent Number: 4,599,586

[45] Date of Patent: Jul. 8, 1986

[54] MOBIUS CAPACITOR

[76] Inventor: Thomas J. Brown, 82 Sheldon Ave., Staten Island, N.Y. 10312

[21] Appl. No.: 434,411

[22] Filed: Dec. 8, 1982

[51] Int. Cl.$^4$ .......................... H03H 7/01; H03H 1/02
[52] U.S. Cl. .................................... 333/172; 333/184; 333/185; 333/202; 336/225
[58] Field of Search ............... 333/167, 172, 202, 185, 333/219, 181–184, 204–205; 336/225; 338/300, 301, 63, 64, 62, 114, 115, 296–299, 260, 261

[56] References Cited

U.S. PATENT DOCUMENTS

| | | | |
|---|---|---|---|
| 2,694,185 | 11/1954 | Kodoma | 333/172 |
| 3,267,406 | 8/1966 | Davis | 336/225 |
| 3,753,161 | 8/1973 | Iwakami | 333/172 |

Primary Examiner—Marvin L. Nussbaum

[57] ABSTRACT

An electric element, utilizing a capacitive enclosure of a mobius strip and the spacial phenomenon thereof, to measure voltage and phase differences of input signals or to act as a filter to attenuate current flow of a resonant frequency and the harmonics of that frequency while passing intermediate frequencies.

6 Claims, 13 Drawing Figures

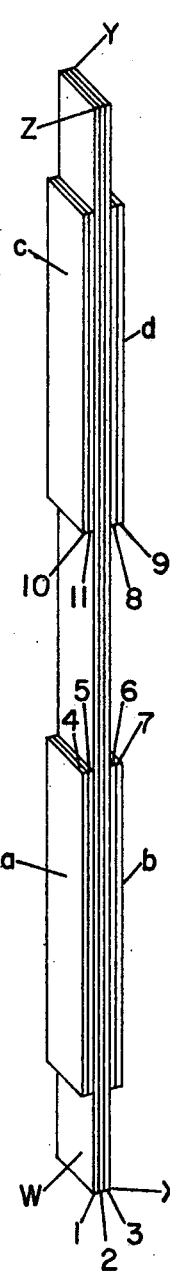
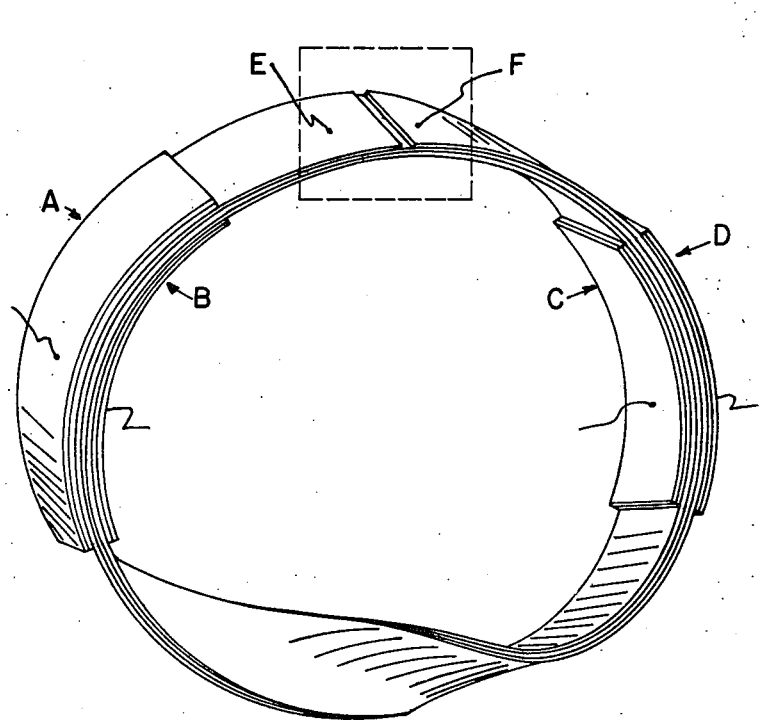
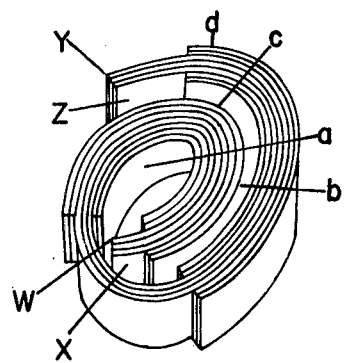
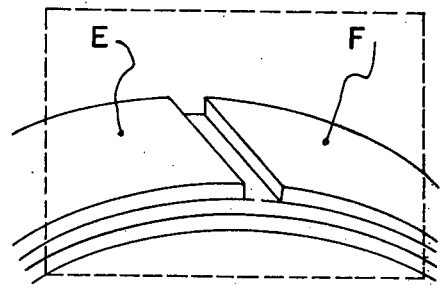
FIG. 12
FIG. 10
FIG. 13
FIG. 11

MOBIUS CAPACITOR

The mobius resistor referred to in the description of the preferred embodiment of the invention is the invention of R. L. Davis U.S. Pat. No. 3,267,406 patented 8/16/66.

SUMMARY OF THE INVENTION

This invention relates to electrical capacitors, particularly to frequency sensitive capacitors with a resonant substructure.

This invention comtemplates utilizing the mobius resistor, which is known in the prior art to be two conductive surfaces separated by a dielectric material twisted 180 degrees and connected to form a mobius strip to provide a resistor which has no residual self-inductance, as the interior substructure of a capacitor. The mobius capacitor is constructed by layering the continuous conductive surface of the mobius resistor with a second dielectric material, then layering this dielectric with two separate conductive surfaces of size compatable with the mobius resistor in such a way that the conductive surfaces are diametrically opposite each other and simultaneously the normals of each conductive surface are parallel to the normal of the surface of the mobius resistor at all points along the surface of the mobius resistor. Electrical leads are attached to each conductive surface as connections to circuits, in series or parallel. The mobius capacitor can also be constructed by layering the continuous conductive surface of the mobius resistor with a second dielectric material, then layering this dielectric with two, four, six, etc. separate conductive surfaces in such a way that each pair of conductive surfaces are diametrically opposite each other and simultaneously the normals of each conductive surface are parallel to the normal of the surface of the mobius resistor at all points along the surface of the mobius resistor.

This invention futher contemplates utilizing the electrical equivalent of a mobius resistor; that is two conductive surfaces separated by a dielectric material twisted X degrees (where X equals 180 degrees multiplied by n, where n is an off interger) and connected to form the topological equivalent of a mobius strip, enclosed between two conductive surfaces and dielectrics of a capacitor.

A object of the invention is to provide an electric element in the form of a mobius resistor enclosed between the two conductive plates and dielectric material of a capacitor.

Another object of the invention is to provide an electric element in the form of an electrical equivalent to a mobius resistor enclosed between the two conductive plates and dielectric materials of a capacitor.

Another object of the invention is to provide an electric element in the form of a mobius resistor or electrical equivalent enclosed by the conductive surfaces and dielectrics of a series of two or more capacitors.

Another object of the invention is to provide an element which will pass integral multiples of a signal frequency while attenuating intermediate frequencies.

An additional object of the invention is to provide an element which can be used to detect voltage and phase variations of two signal frequencies.

Futher objects of the invention will be apparent from the following drawings and description of the preferred embodiment of the invention.

DESCRIPTION OF THE DRAWINGS

FIG. 10 is an elevated view of another alternate embodiment of the invention.

FIG. 11 is a detailed view on an enlarged scale of a portion of the structure shown in FIG. 10.

FIG. 12 is a perspective view of the materials from which an alternate embodiment of the invention can be made.

FIG. 13 is a perspective view of the materials shown in FIG. 12 after these materials are rolled.

DESCRIPTION OF THE PREFERRED EMBODIMENT

1. Frequency Related Properties of the Mobius Resistor:

While it is known in the prior art, that the mobius resistor will provide a resistor with no residual self-inductance, there exist a small capacitive side effect intrinsic to the mobius resistor which can have significant utility. By modifying the material composition of the mobius resistor from one of primarily resistive material to one of primarily conductive material this capacitive side effect is increased. It is this capacitive effect that will be considered now.

Figure 1:
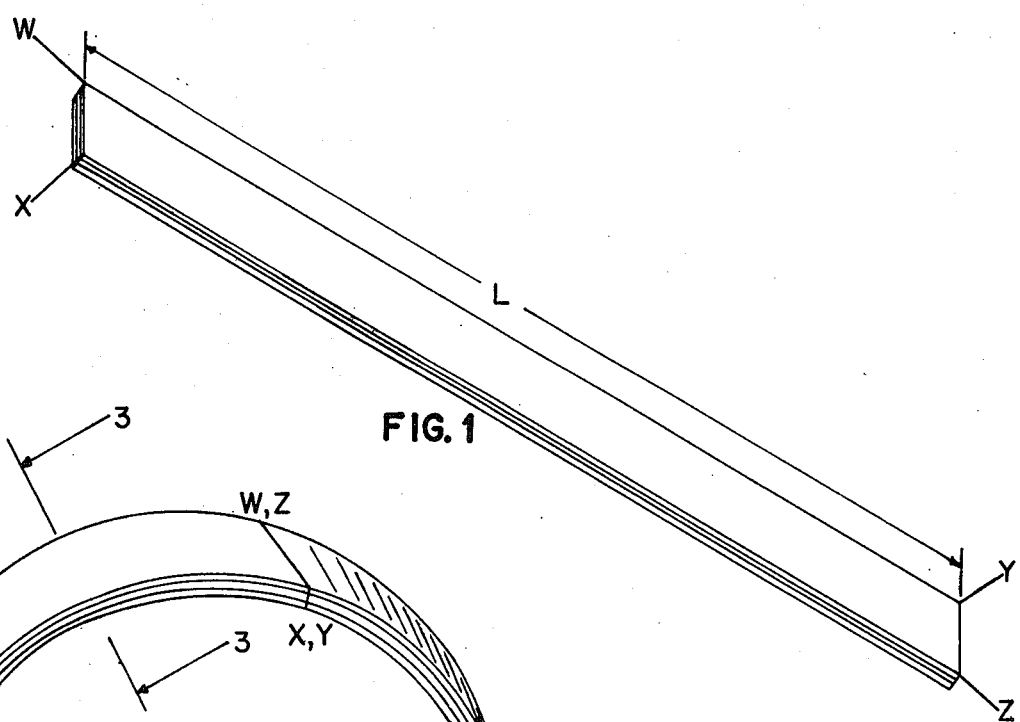
FIG. 1 is a perspective view of three strips of material of length L from which a mobius resistor can be made.
Figure 2:
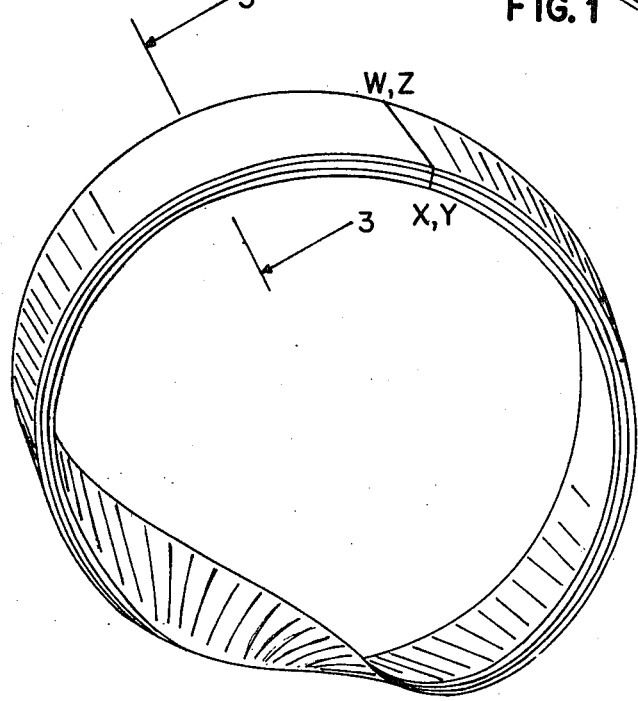
FIG. 2 is a perspective view of a mobius resistor.

Referring to FIGS. 1 and 2 of the drawings, a mobius resistor can be formed by taking the elongated sheets WXYZ, that is two conductive sheets separated by a dielectric sheet, as in FIG. 1 and attaching its two ends after twisting one end 180 degrees with respect to the other end so that diagonally opposite corners of the sheet are joined, i.e. WY and XY in FIG. 2. The resultant mobius resistor has a single surface which runs continuously along the surface of the mobius strip. In this disclosure the length of the mobius resistor refers to the dimensions following the circumference of the endless mobius which would be parallel to a line running between the opposite short ends of the strip if it were cut and laid flat on the surface as shown in FIG. 1.

Figure 3:
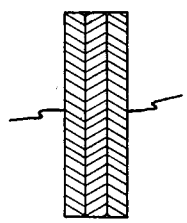
FIG. 3 is a section view taken through line 3—3 of FIG. 2.

It can be seen with the aid of FIG. 3, the mobius resistor has a dielectric layer made from a suitable insulating material which can be similar to that used for the dielectric of a capacitor and a conductive layer which in the sectional view of FIG. 3 appears as two separate layers on opposite surfaces of the dielectric. In actuality the conductive layer due to the nature of a mobius strip is a single continuous length of conductive material having regions which are normally spaced from one another, that is spaced in the direction normal to the surface of the mobius resistor, but which are part of a common continuous lenght of conductive material affixed to the surface of the dielectric layer.

The continuity of the respective dielectric and conductive layers is only in the circumferrential direction running the length of the mobius resistor and not in the direction transverse to the length. Direct current applied between two points on the conductive surface of the mobius resistor will flow substantially in the circumferential direction and not in the transverse direction due to the interuption of the continuity between regions of the conductive surface in the normal direction by the layer of dielectric material.

Application of an alternating voltage between two points on the conductive surface of the mobius resistor induces a field in the dielectric opposing the flow of a resultant alternating current whereby the mobius resistor exhibits a capacitive type reactance at frequencies other than those corresponding to a wave length equal to the length of the mobius strip or an integral multiple of the length. As a result the mobius resistor has the property of passing attenuated components of an applied signal having a wavelength which is not equal to the length of the mobius strip or an intergral multiple of that length.

Current flow between two normally opposite points A and B on the conductive surface of the mobius resistor which are separated circumferentially by a distance equal to the length of the mobius strip will now be considered. Such normally opposite points are on a common line normal to the surface of the mobius resistor and passing through the points A and B.

Let 'c' equal the speed of propagation of an electric field wave between points A and B; 'T' equal the time it takes the wave to travel from point A to point B; 'L' equals the length of the mobius resistor. 'T' than equals L/c.

If a sinusodial voltage is applied at A, the voltage at point A is given by $$V_a = V \sin 2\pi f t \quad (1)$$

where V is the maximum amplitude of the AC voltage wave; 'f' is the frequency of the voltage and 't' is the time at which the voltage is being determined. The voltage at point B is then given by $$V_b = V \sin 2\pi f(t + L/c) \quad (2)$$

The voltage potential across points A and B at any time t is then given by $$V = V \sin 2\pi f t - V \sin 2\pi f(t + L/c). \quad (3)$$

At high frequencies other than those having wavelengths equal or close to the length of the mobius strip or integral multiples thereof the mobius resistor will exhibit a capacitance and the relationship among the voltage potential between point A and B and the current flowing between the points will be $dv/dt = i/C$, where 'dv/dt' is the derivative of the voltage with respect to time, 'i' is the curent flowing between points A and B, and 'C' is the capacitance between points A and B.

Taking the derivative of equation (3) above and setting it equal to i/C, the induced current flowing between points A and B is given by $$i_c = CV(2\pi f \cos 2\pi f t(1 - \cos 2\pi f L/c) - 2f \sin 2\pi f t \sin (2\pi f L/c)) \quad (4)$$

Examining equation (4), it is seen when $f = c/L$, $i_c = 0$.

Thus, when connected in parallel with a circuit at points A and B, the mobius resistor will permit a resonant frequency and the harmonics of that frequency to pass in the circuit unattenuated but will attenuate other frequencies.

Figure 5:
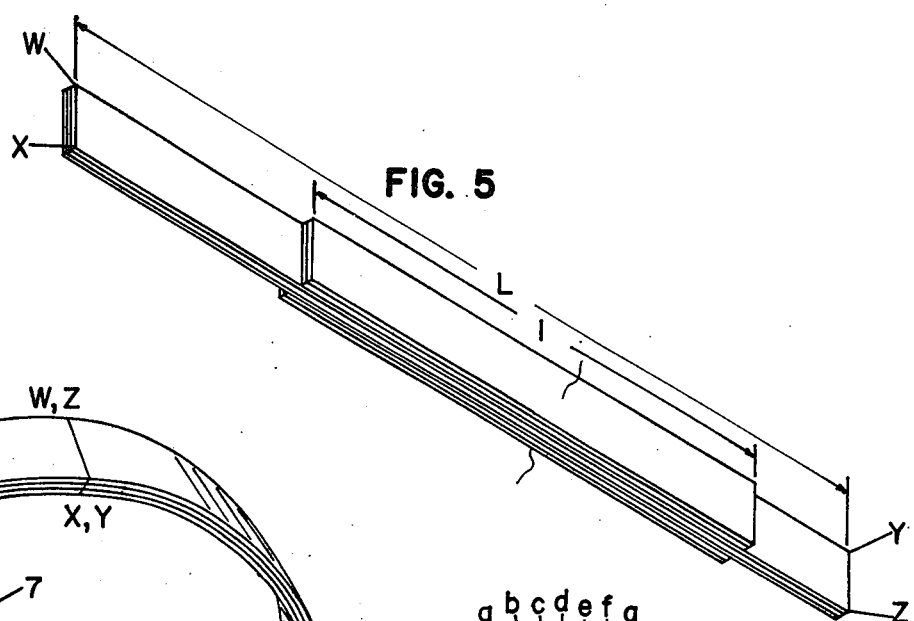
FIG. 5 is a perspective view of seven strips of material, three of length L and four of length l from which the apparatus of the invention can be made.
Figure 6:
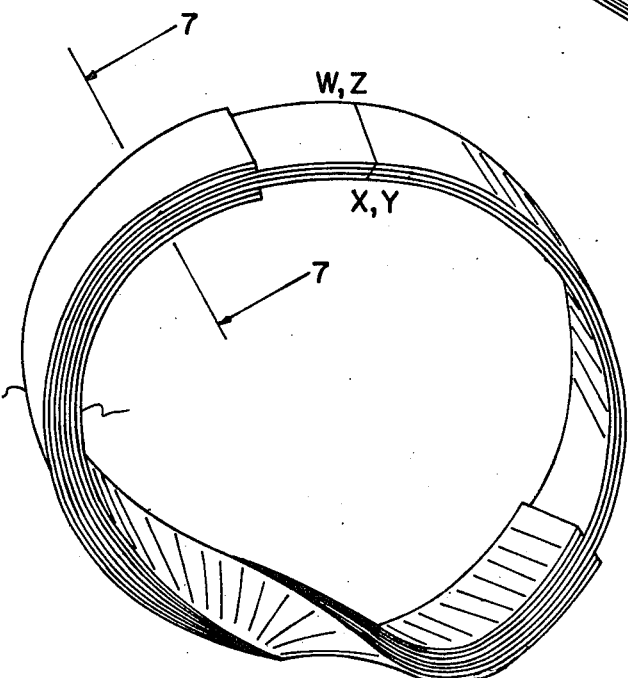
FIG. 6 is a perspective view of the apparatus of the invention.

2. Frequency Related Porperty of the Mobius Capacitor:

Referring now to FIGS. 5 and 6, a mobius capacitor can be formed by taking the sheets WXYZ, which are enclosed by the dielectric and conductive surfaces (or plates) of a capacitor of length '1', where 'L' is greater than '1' (FIG. 5) and attaching it's two ends after twisting one end 180 degress with respect to the other end so that diagonally opposite corners of the sheet WXYZ are joined, while the conductive outer plates of the capacitor have not changed position with respect to one another nor have they been connected at any point.

For continuity of analysis we consider here a mobius capacitor where the outer conductive surface area is significantly smaller than the surface area of the mobius resistor with one conductive surface located above point A and the other conductive surface located above point B. With the application of an alternating voltage to the outer conductive surfaces of the mobius capacitor there will exist three distinct electric currents flowing in the mobius capacitor. The conventional current in the forward transverse direction associated with the outer conductive plates, the alternating voltage applied to the outer plates will be transmitted to the surface of the mobius resistor inducing a second current in the circumferential direction, which will create a secondary voltage potential on the surface of the enclosed mobius resistor given by equation (3) causing a third reactive current in the transverse direction given by equation (4). The circumferential current will not effect the capacitance of the mobius capacitor because the electric field associated with this current will be orthoganal with respect to the electric field associated with the outer plates of the mobius capacitor at all points. The circumferential current will be a power loss factor in the circuit. Thus if we consider the two transverse currents it can be seen from equation (4) that the mobius capacitor will permit a resonant frequency and it's harmonics to pass in the circuit unattenuated but will attenuate all other frequencies.

3. Non-frequency Related Properity of the Mobius Capacitor:

It can be determined from equation (4) that if the wavelength of the input signal to the mobius capacitor is significantly less that length 'L' then the resonant effect of the mobius capacitor is negligible.

Thus far in this description of the preferred embodiment we have used mathemetical equations which are derivable from Maxwell's Equations. This being justifed by the sectionalization of the mobius capacitor for purposes of analysis. When examining the electrical properties of the mobius capacitor taken as a whole enity, we confront the fact that the mobius strip is a non-orientable surface (that is one can not differentiate between the inside and the outside of the object) and as Maxwell's Equations presupposes a Gaussian space (an orientable space) these equations are unreliable for analysis in totem. Therefore in the analysis that follows, the only electrical property we will assume to be valid on a non-guassian surface is that like charges repel one another while opposite charges attract one another.

In order the simplify the description and analysis of the non-frequency related properity of the mobius capacitor we will define the following:

(a) A capacitive enclosure.

Figure 7:
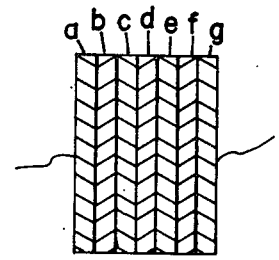
FIG. 7 is a section view taken through line 7—7 of FIG. 6.
Figure 9:
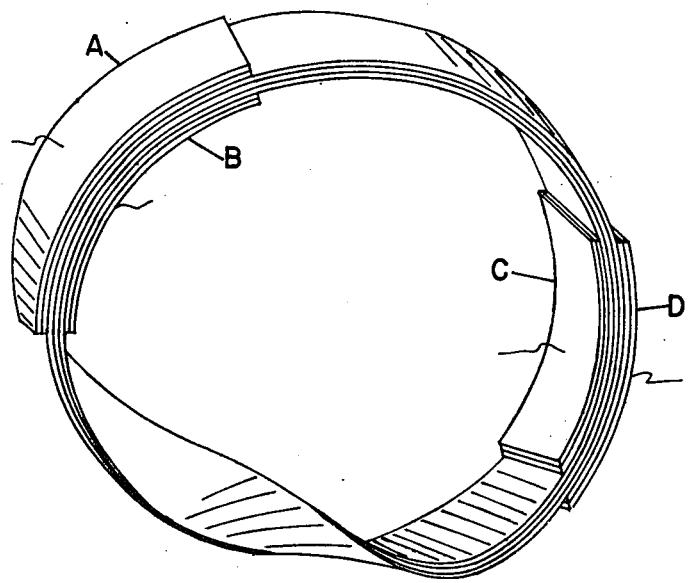
FIG. 9 is a perspective view of another alternate embodiment of the invention.

A layer of nonconductive material having opposite surfaces defining a continuous uniform non-orentable surface in the form of a mobius strip is illustrated as the middle layer of FIG. 6 and layer d of FIG. 7. A single layer of resistive material disposed in a continuous manner circumferentially along the formed surface of the mobius strip illustrated in FIG. 6 and as the two proximal layers to the middle layer in layers c and e of FIG. 7. A second layering of two separately disposed nonconductive materials in series along the continuous surface is illustrated as the two proximal layers to the said single layer of the resistive material in FIG. 6 and in layers b and f of FIG. 7. A final layer of two separately disposed conductive materials in series along the continuous surface contiguous with the said second layer of two separately disposed nonconductive materials is illustrated as the outer plates of the capacitor in FIG. 6 and layers a and g of FIG. 7. It is the area of the mobius resistor (illustrated by FIGS. 6, 7c, 7d and 7e) which is layered with nonconductive material in series along the continuous surface (illustrated by FIGS. 6, 7b and 7f) and futher layered by outer plates (illustrated by FIGS. 6, 7a and 7g) which we define as enclosed by the outer plates. It is this enclosed area of the mobius resistor in conjunction with the layer of nonconductive material and the outer plates which constitute a 'capacitive enslosure' of the mobius capacitor. FIG. 9 illustrates a mobius capacitor with two capacitive enclosures. With outer plates labeled A,B,C and D we can refer to the respective capacitive enclosures as 'capacitive enclosure A-B' and 'capacitive enclosure C-D'.

(b) An area.

The area located on the conductive continuous surface of the mobius resistor directly below and nearest to the plate labeled A is defined as 'area-A'. Similarly, in the configuration of FIG. 9 we define area-B, area-C and area-D on the continuous conductive surface of the mobius resistor.

(c) A path.

Using the definition of an area, such as area-A as described above, we define 'path A-B' to be the shortest circumferential path along the continuous conductive surface of the mobius resistor between area-A and area-B. In the configuration of FIG. 9 we can also define 'path B-C', 'path A-C', 'path B-D' as the shortest circumferential path along the continuous conductive surface of the mobius resistor beween those respective areas.

(d) A path-break.

Consider the illustrations of FIG. 10 and FIG. 11. FIG. 10 being the same as FIG. 9 in configuration with the exception of a discontinuity along path A-D of the mobius resistor and the two electrical leads labeled E and F respectively. FIG. 11 is an enlarged view of this discontinuity and the electrical leads along path A-D. Therefore a 'path-break' is defined as a discontinuity along a path.

Notice that the configuration of FIG. 11 is not a mobius capacitor due to the path-break, but if the electrical leads are connected to one another the mobius capacitive structure will still be maintained. For that matter if the electrical leads E and F are connected to a closed circuit, then the mobius capacitive structure will still be maintained.

Referring now to FIG. 9 and to the terms defined above, consider the following. An equal static voltage is applied to capacitive enclosure A-B and capacitive enclosure C-D in such a way that plate A is positively charged and plate B is charged, while plate C is positively charged and plate D is negatively charged; the capacitive enclosures A-B and C-D acting as electrical input to the mobius capacitor.

The applied voltage on the outer plate A of the capacitive enclosure A-B will induce a positive charge on to area-A and a negative charge is similarly induced on to area-B. Simultaneously the applied voltage of the capacitive enclosure C-D will induce a positive charge on area-C and a negative charge on area-D.

These four charged areas will exist simultaneously on the same continuous conductive surface. This charge distribution imbalance cause a current flow along this continuous conductive surface. In this particular configuration of FIG. 9 it can be readily seen that the current flow is restricted to path A-D and path B-C as opposite charges attract one another. Also it can be seen that there will be no current flow along path B-D and path A-C as like charges repel one another. It can also be seen that path A-D and path B-C are one one and the same side of the mobius resistor while path A-C and path B-D are on the other side.

Reversing the applied static voltage on both the capacitive enclosures, the current will flow along the same paths (path A-D and path B-C) for the same reasons as above, but in the opposite direction.

If there is a closed path-break (a path-break with the electric leads connected or connected to a closed circuit) along any or all paths this will not change the fundamental charge distribution imbalance and the direction and path of the current flow will not change.

Notice that in the configuration of FIG. 9 as described above path A-C and path B-D will have no current flow, as this current is blocked by like charges repelling one another. This effect breaks the 'electrical' continuity of the continuous conductive surface of the mobius resistor and may allow conventional analysis of the current flow along path A-D and path B-C.

Considering the same configuration, if the applied voltages to the input capacitive enclosures are alternating and are equal and in phase and of the same polarity as described above, the same effect of an electrical discontinuity is achieved but the currrent flow along paths A-D and B-C will be alternating in direction and proportional to the voltages applied.

Consider futher that if the applied alternating voltages of capacitive enclosures A-B and C-D are not equal and in phase, then the effect of an electrical discontinuity will be nullified, therein we would have current flow along all four possible paths in varing direction and at varing times.

One need only measure the current or test for the existence of the current along two paths to determine if the voltages are equal and in phase, one measurement along path A-D or path B-C and one measurement along eighter path A-C or path B-D. If current is detected along only one path then the voltage must be equal and in phase.

The currents can be detected by measuring the induced magnetic fields of the current flow through conventional means or by using a closed path-break with a current detection circuit, such as a current meter, as a means of closing the path-break or simply use a third capacitive enclosure as input to a current detection circuit.

Figure 4:
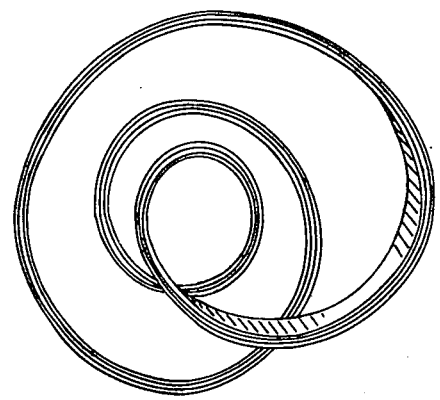
FIG. 4 is an elevated view of an electrical equivalent of a mobius resistor.

4. Alternate Construction Methods:

FIG. 4 is an illustration of the electrical equivalent of a mobius resistor wherein it is two conductive sheets of material separated by a dielectric material twisted X degrees where X equals 180 degrees multiplied by n, n being an odd interger and connected to form the topological equivalent of a mobius resistor.

Figure 8:
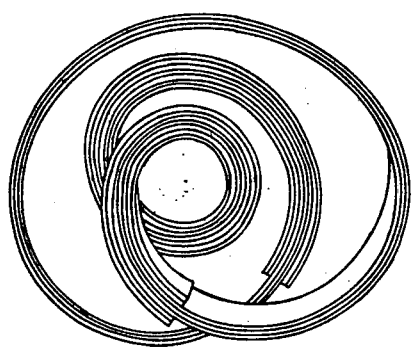
FIG. 8 is an elevated view of an alternate embodiment of the invention.

FIG. 8 is an illustration of a capacitive enclosure along the electrical equivalent of a mobius resistor, therein comprising an electrical equivalent to a mobius capacitor with one capacitive enclosure.

Another method of constructing a mobius capacitor with two capacitive enclosures and two path-breaks, in such a way that the construction is simple and inexpensive is as follows.

Referring now to FIG. 12, eleven sheets of material are laid as illustrated, where sheets labeled 1,3,4,7,9 and 10 are made of conductive material and sheets labeled 2,5,6,8 and 11 are are made of a dielectric material. The sheets labeled 1,2 and 3 comprise the materials to form a mobius resistor; The sheets labeled 4,5,6 and 7 comprise the material for the outer plates and dielectric of one capacitive enclosure, while sheets labeled 8,9,10 and 11 the outer plates and dielectric of the second capacitive enclosure. If this configuration were twisted and connected we would have a standard mobius capacitor with two capacitive enclosures.

Note that there are eight electrical leads attached to the conductive surfaces; leads a and b are for the first capative enclosure; leads c and d are for the second capacitive enclosure leads W and Z are both attached to the conductive surface labeled 1 at opposite ends; and leads X and Y are both attached to the conductive surface labeled 3.

Consider now connecting electrical lead Z to lead X and connecting electrical lead Y to lead W, the effect of this connection is to construct a mobius capacitor with two capacitive enclosures and with two path-breaks.

Consider futher that if the configuration illustrated by FIG. 12 were rolled starting at the end of the sheets with the electrical leads labeled W and X, we would have an apparatus as illustrated in FIG. 13. Connecting electrical leads Z to X and Y to W we have a mobius capacitor with two capacitive enclosures and two path-breaks, as the process of rolling and connecting will intrinsicly twist the apparatus.

The mobius capacitor can be used in numerous applications, one of which would be the filtering of square waves or sawtooth waves because of the harmonic composition of these types of waves, another application would be the testing of two input signals to determine that the two signals are equal and in phase.

While the invention has been illustrated by means of a preferred embodiment, it is to be appreciated that various modifications and alterations can be made to the preferred embodiment without departing from the spirit and scope of the invention which is defined in the following claims.

What is claimed is:

1. An electrical component comprising in combination:
    (a) a layer of non-conductive material having opposite surfaces defining a continuous uniform surface in the form of a mobius strip
    (b) a single layer of resistive material disposed in a continuous manner circumferentially along the surface of the formed mobius strip
    (c) a second layer of non-conductive material disposed in a continuous manner circumferentially covering the said continuous surface of resistive material
    (d) two outer resistive materials separately disposed in series along the continuous surface covering the said second layer of non-coductive material in such a manner that these outer resistive materials are diametrically opposite one another and the normals to the surfaces of the said outer resistive materials are parallel to each other and also parallel to the non-orientable normal to the continuous surface of the mobius strip
    (e) electrical leads connected to the separate outer layers of resistive material.

2. An apparatus according to claim 1 such that the layer of non-conductive material having opposite surfaces defining a continuous surface is in the form of a mathematically non-orientable surface similar to a mobius strip in that there is no directed normal to the surface.

3. An apparatus according to claim 1 or claim 2, wherein three or more outer resistive materials are disposed separately and circumferentially in series along the continuous surface of the second layer of non-conductive material in such a manner that at least part of the surface area of each of the separate resistive materials is diametrically opposite some part of at lease one other separate resistive material in the series, electric leads are connected to outer resistive material.

4. An electrical component comprising in combination:
    (a) a layer of non-conductive material having opposite surfaces defining a continous uniform surface in the form of a mobius strip
    (b) a series of interconnected layers of resistive material disposed along the surface of the formed mobius strip
    (c) a second layer of non-conductive material having first and second surfaces disposed in a continuous manner with the first surface covering the said series of interconnected layers of resistive materials
    (d) at least two outer resistive materials separately disposed in series along the said second surface and covering the said second layer of non-conductive material in such a manner that these outer resistive materials are diametrically opposite one another and the normals to the surfaces of said outer resistive materials are parallel to each other and also parallel to the non-orientable normal to the continuous surface of the mobius strip
    (e) electrical leads connected to the separate outer layers of resistive material.

5. An apparatus according to claim 4 such that the layer of non-conductive material having opposite surfaces defining a continuous surface is in the form of a mathematically non-orientable surface simular to a mobius strip in that there is no directed normal to the surface.

6. An apparatus according to claim 4 or claim 5, wherein three or more outer resistive materials are disposed separately and circumferentially in series along the surface of the second layer of non-conductive material in such a manner that at least part of the surface area of each of the separate resistive materials is diametrically opposite some part of at least one other separate resistive material in the series.

* * * * *